United States Patent
Ngai

(10) Patent No.: US 8,743,779 B2
(45) Date of Patent: Jun. 3, 2014

(54) SYSTEMS, APPARATUS AND METHODS TO FACILITATE SIMULTANEOUS TRAFFIC-IDLE OR IDLE-IDLE DEMODULATION

(75) Inventor: Francis M. Ngai, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 12/876,332

(22) Filed: Sep. 7, 2010

(65) Prior Publication Data

US 2011/0255412 A1 Oct. 20, 2011

Related U.S. Application Data

(60) Provisional application No. 61/325,165, filed on Apr. 16, 2010.

(51) Int. Cl.
*H04W 4/00* (2009.01)
(52) U.S. Cl.
USPC .......................... 370/328; 370/341; 455/404.1
(58) Field of Classification Search
None
See application file for complete search history.

(56) References Cited

U.S. PATENT DOCUMENTS

| | | | |
|---|---|---|---|
| 7,899,489 B2 * | 3/2011 | Hidaka et al. | 455/552.1 |
| 2001/0034233 A1 * | 10/2001 | Tiedemann et al. | 455/436 |
| 2006/0017626 A1 * | 1/2006 | Kannan et al. | 343/702 |
| 2006/0281486 A1 * | 12/2006 | Ngai et al. | 455/552.1 |
| 2009/0046632 A1 | 2/2009 | Nanda et al. | |
| 2009/0247167 A1 | 10/2009 | Higashide | |
| 2010/0040019 A1 | 2/2010 | Tinnakornsrisuphap et al. | |
| 2010/0099439 A1 * | 4/2010 | Aghili et al. | 455/458 |
| 2010/0279689 A1 * | 11/2010 | Tinnakornsrisuphap et al. | 455/435.2 |
| 2011/0019638 A1 * | 1/2011 | Hamel et al. | 370/331 |
| 2011/0044380 A1 * | 2/2011 | Marra et al. | 375/219 |
| 2011/0306316 A1 * | 12/2011 | Wu | 455/404.1 |

FOREIGN PATENT DOCUMENTS

| | | |
|---|---|---|
| JP | 2002529988 A | 9/2002 |
| JP | 2009246421 A | 10/2009 |
| JP | 2010537573 A | 12/2010 |
| JP | 2011528540 A | 11/2011 |
| WO | WO-0027155 A1 | 5/2000 |
| WO | WO-2009026157 A2 | 2/2009 |
| WO | WO-2010009162 A1 | 1/2010 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)". 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V9.2.0, Jan. 7, 2010, pp. 1-178, XP050401821, [retrieved on Jan. 7, 2010].
International Search Report and Written Opinion—PCT/US2011/032874—ISA/EPO—Aug. 4, 2011.
European Search Report—EP13182976—Search Authority—Munich—Oct. 1, 2013.

* cited by examiner

*Primary Examiner* — Brian D Nguyen
*Assistant Examiner* — Roberta A Shand

(57) ABSTRACT

Systems and methods for facilitating simultaneous operations are provided. The methods can include monitoring a common channel to evaluate cells or sectors in an active set, wherein monitoring is performed by a user equipment having a single receiver chain configured to receive traffic and idle information. The methods can also include demodulating channels, using the single receiver chain, including demodulating one or more emergency alerts, wherein demodulating is performed for a radio access technology and a protocol stack associated with the radio access technology.

60 Claims, 12 Drawing Sheets

SYSTEMS, APPARATUS AND METHODS TO FACILITATE SIMULTANEOUS TRAFFIC-IDLE OR IDLE-IDLE DEMODULATION

CROSS-REFERENCE TO RELATED APPLICATIONS

This application claims the benefit of U.S. Provisional Patent Application Ser. No. 61/325,165 titled "SYSTEMS, APPARATUS AND METHODS TO FACILITATE SIMULTANEOUS TRAFFIC-IDLE OR IDLE-IDLE DEMODULATION," which was filed Apr. 16, 2010, and the entire contents of which are incorporated herein by reference.

BACKGROUND

I. Field

The following description relates to wireless communications, in general, and to facilitating simultaneous traffic-idle or idle-idle demodulation in wireless communication systems, in particular.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, worldwide interoperability for microwave access (WiMAX), orthogonal frequency division multiple access (OFDMA) systems, etc.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Notwithstanding the above, a current paradigm with user equipments (UEs) in various wireless communication systems, including the CDMA 1x system, is that a radio access technology (RAT) is in only one state only at any given time. However, this approach can lead to inefficiency and, in some cases, an inability to facilitate emergency alert services to the UE.

For example, UEs may not be able to receive emergency alerts while in a traffic/active state because United States carriers may broadcast short message service (SMS) on common channels to send emergency alerts to subscribers. As such, subscribers using current UEs may not be able to receive these emergency alerts when the subscribers are on a call.

As another example, active mode Femto cell hand-ins may interrupt traffic operations on a macro network because procedures for hand-in from the macro network require a UE to demodulate Femto cell-related messages on a common channel of the Femto cell. As a result, for a UE on a call on the macro network and using the current paradigm of only one state at any given time for the protocol stack, the ongoing call of the UE may be interrupted as the UE may perform tune-aways to the Femto cell to demodulate the Femto cell messages (e.g., access point pilot information messages (APPIMs), access point identification messages (APIDMs), access point identification text messages (APIDTMs)).

As another example, Femto cell idle mode hand-ins may interrupt idle mode operations on the macro network because procedures for hand-in from the macro network require a UE to demodulate Femto cell-related messages on a common channel of the Femto cell. As a result, for a UE operating in idle mode on the macro network and using the current paradigm of only one state at any given time for the protocol stack, the idle state of the UE may be interrupted as the UE may perform tune-aways to the Femto cell to demodulate the Femto cell messages.

As such, systems, apparatus and methods to facilitate simultaneous or concurrent traffic-idle or idle-idle demodulation for active mode hand-in, or idle mode hand-in, without interruption of traffic/active operations, or idle mode operations, respectively, on the macro network, are therefore desired.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating simultaneous or concurrent traffic-idle or idle-idle demodulation.

In some aspects, a method is provided. The method can include: monitoring a common channel to evaluate cells or sectors in an active set, wherein monitoring is performed by a user equipment having a single receiver chain configured to receive traffic and idle information; and demodulating channels, using the single receiver chain, including demodulating one or more emergency alerts.

In some aspects, a computer program product having a computer-readable medium is provided. The computer program product can include: a first set of codes for causing a computer to monitor a common channel to evaluate cells or sectors in an active set, wherein monitoring is performed by a user equipment having a single receiver chain configured to receive traffic and idle information; and a second set of codes for causing the computer to demodulate channels, using the single receiver chain, including demodulating one or more emergency alerts.

In some aspects, an apparatus is provided. The apparatus can include: An apparatus, comprising: means for monitoring a common channel to evaluate cells or sectors in an active set, wherein monitoring is performed by a user equipment having a single receiver chain configured to receive traffic and idle information; and means for demodulating channels, using the single receiver chain, including demodulating one or more emergency alerts.

In some aspects, another apparatus is provided. The apparatus includes a receiver system configured to: monitor a common channel to evaluate cells or sectors in an active set, wherein monitoring is performed by a user equipment having a single receiver chain configured to receive traffic and idle information; and demodulate channels, using the single receiver chain, including demodulating one or more emergency alerts.

In other aspects, another method is provided. The method can include: receiving traffic information on a first receiver chain; receiving idle information on a second receiver chain, wherein the first receiver chain and the second receiver chain are included in a single receiver of user equipment and perform at least one of independent searching or set maintenance; and demodulating channels, wherein demodulating is performed for a radio access technology and a protocol stack associated with the radio access technology.

In other aspects, another computer program product having a computer-readable medium can include: a first set of codes for causing a computer to receive traffic information on a first receiver chain; a second set of codes for causing the computer to receive idle information on a second receiver chain, wherein the first receiver chain and the second receiver chain are included in a single receiver of a user equipment and perform at least one of independent searching or set maintenance; and a third set of codes for causing the computer to demodulate channels, wherein demodulating is performed for a radio access technology and a protocol stack associated with the radio access technology.

In some aspects, another apparatus can include: means for receiving traffic information on a first receiver chain; means for receiving idle information on a second receiver chain, wherein the first receiver chain and the second receiver chain are included in a single receiver of user equipment and perform at least one of independent searching or set maintenance; and means for demodulating channels, wherein demodulating is performed for a radio access technology and a protocol stack associated with the radio access technology.

In still other aspects, another apparatus is provided. The apparatus can include a receiver system configured to: receive traffic information on a first receiver chain; receive idle information on a second receiver chain, wherein the first receiver chain and the second receiver chain are included in a single receiver of user equipment and perform at least one of independent searching or set maintenance; and demodulate channels, wherein demodulating is performed for a radio access technology and a protocol stack associated with the radio access technology.

In another embodiment, another method is provided. The method can include: receiving traffic or first idle information for a first cell on a first receiver chain; receiving second idle information for a second cell on a second receiver chain, wherein the first cell and the second cell are included in at least one of a macro network or a Femto cell; and demodulating channels from the first cell and the second cell, wherein demodulating is performed for a radio access technology and a protocol stack associated with the radio access technology.

In another embodiment, another computer program product including a computer readable medium, is provided. The computer program product can include: a first set of codes for causing a computer to receive traffic or first idle information for a first cell on a first receiver chain; a second set of codes for causing the computer to receive second idle information for a second cell on a second receiver chain, wherein the first cell and the second cell are included in at least one of a macro network or a Femto cell; and a third set of codes for causing the computer to demodulate channels from the first cell and the second cell, wherein demodulating is performed for a radio access technology and a protocol stack associated with the radio access technology.

In another embodiment, another apparatus is provided. The apparatus can include: means for receiving traffic or first idle information for a first cell on a first receiver chain; means for receiving second idle information for a second cell on a second receiver chain, wherein the first cell and the second cell are included in at least one of a macro network or a Femto cell; and means for demodulating channels from the first cell and the second cell, wherein demodulating is performed for a radio access technology and a protocol stack associated with the radio access technology.

In another embodiment, another apparatus is provided. The apparatus can include a receiver system configured to: receive traffic or first idle information for a first cell on a first receiver chain; receive second idle information for a second cell on a second receiver chain, wherein the first cell and the second cell are included in at least one of a macro network or a Femto cell; and demodulate channels from the first cell and the second cell, wherein demodulating is performed for a radio access technology and a protocol stack associated with the radio access technology.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
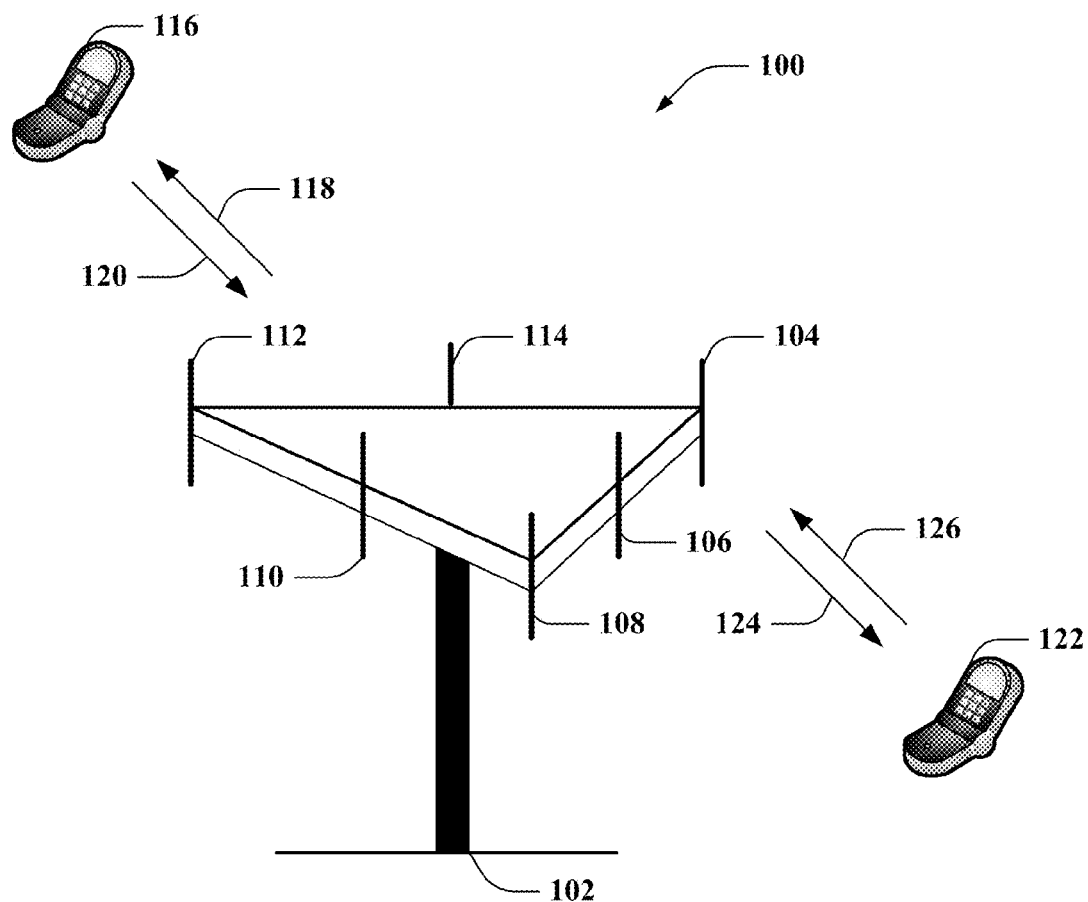
FIG. 1 illustrates a multiple access wireless communication system according to an embodiment described herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, evolved Node B (eNB), or some other terminology. An access terminal may also be called an access terminal, UE, a wireless communication device, terminal, access terminal or some other terminology. Moreover, an access point can be a macrocell access point, femtocell access point, picocell access point, and/or the like.

In various embodiments, as described herein, one or more segments or one or more extension carriers can be linked to a regular carrier resulting in a composite bandwidth over which the UE can transmit information to, and/or receive information from, the eNB.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 2:
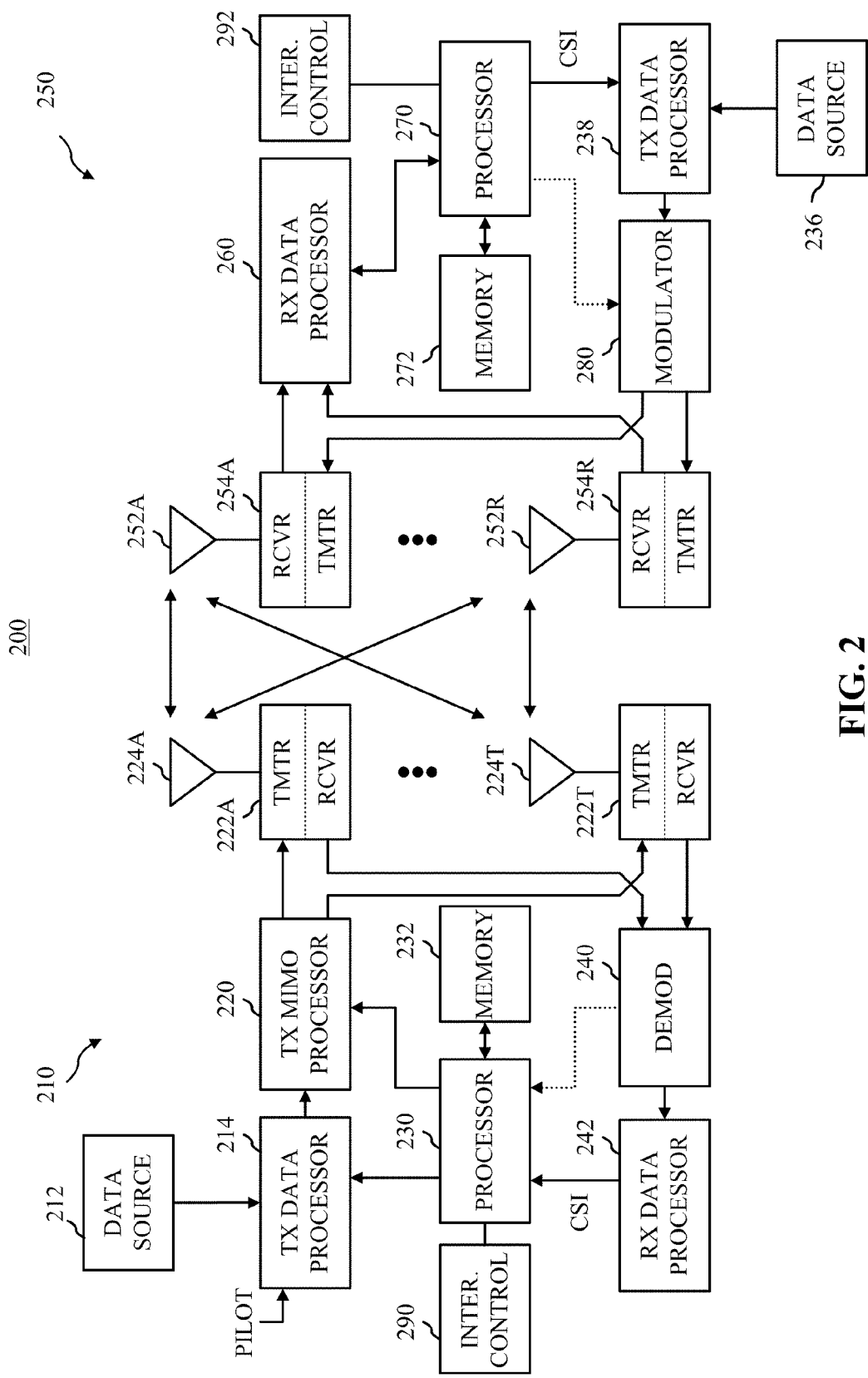
FIG. 2 illustrates an example wireless communication system in which the embodiments described herein can be employed in accordance with various aspects set forth herein.

FIG. 2 is a block diagram of an embodiment of a transmitter system (also known as the access point) and a receiver system (also known as access terminal) in a MIMO system 200. The receiver system can be employed in a UE such as that described herein to facilitate simultaneous (or concurrent) traffic/active and idle operations as described below with reference to FIGS. 5, 6 and 7. FIG. 2 shows an example wireless communication system in which the embodiments described herein can be employed in accordance with various aspects set forth herein. The teachings herein may be incorporated into a node (e.g., a device) employing various components for communicating with at least one other node. FIG. 2 depicts several sample components that may be employed to facilitate communication between nodes. Specifically, FIG. 2 illustrates a wireless device 210 (e.g., an access point) and a wireless device 250 (e.g., an access terminal) of a wireless communication system (e.g., MIMO system 200). At the device 210, traffic data for a number of data streams is provided from a data source 212 to a transmit (TX) data processor 214.

In some aspects, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transceivers (XCVR) 222A through 222T. In some aspects, the TX MIMO processor 220 applies beamforming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222A through 222T are then transmitted from $N_T$ antennas 224A through 224T, respectively.

At the device 250, the transmitted modulated signals are received by $N_R$ antennas 252A through 252R and the received signal from each antenna 252 is provided to a respective transceiver (XCVR) 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive (RX) data processor 260 then receives and processes the $N_R$ received symbol streams from $N_R$ transceivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the device 210.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the device 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the device 250 are received by the antennas 224, conditioned by the transceivers 222, demodulated by a demodulator (DEMOD) 240, and processed by a RX data processor 242 to extract the reverse link message transmitted by the device 250. The processor 230 then determines which pre-coding matrix to use for determining the beam-forming weights then processes the extracted message.

FIG. 2 also illustrates that the communication components may include one or more components that perform interference control operations as taught herein. For example, an interference (INTER.) control component 290 may cooperate with the processor 230 and/or other components of the device 210 to send/receive signals to/from another device (e.g., device 250) as taught herein. Similarly, an interference control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the interference control component 290 and the processor 230 and a single processing component may provide the functionality of the interference control component 292 and the processor 270.

Figure 3:
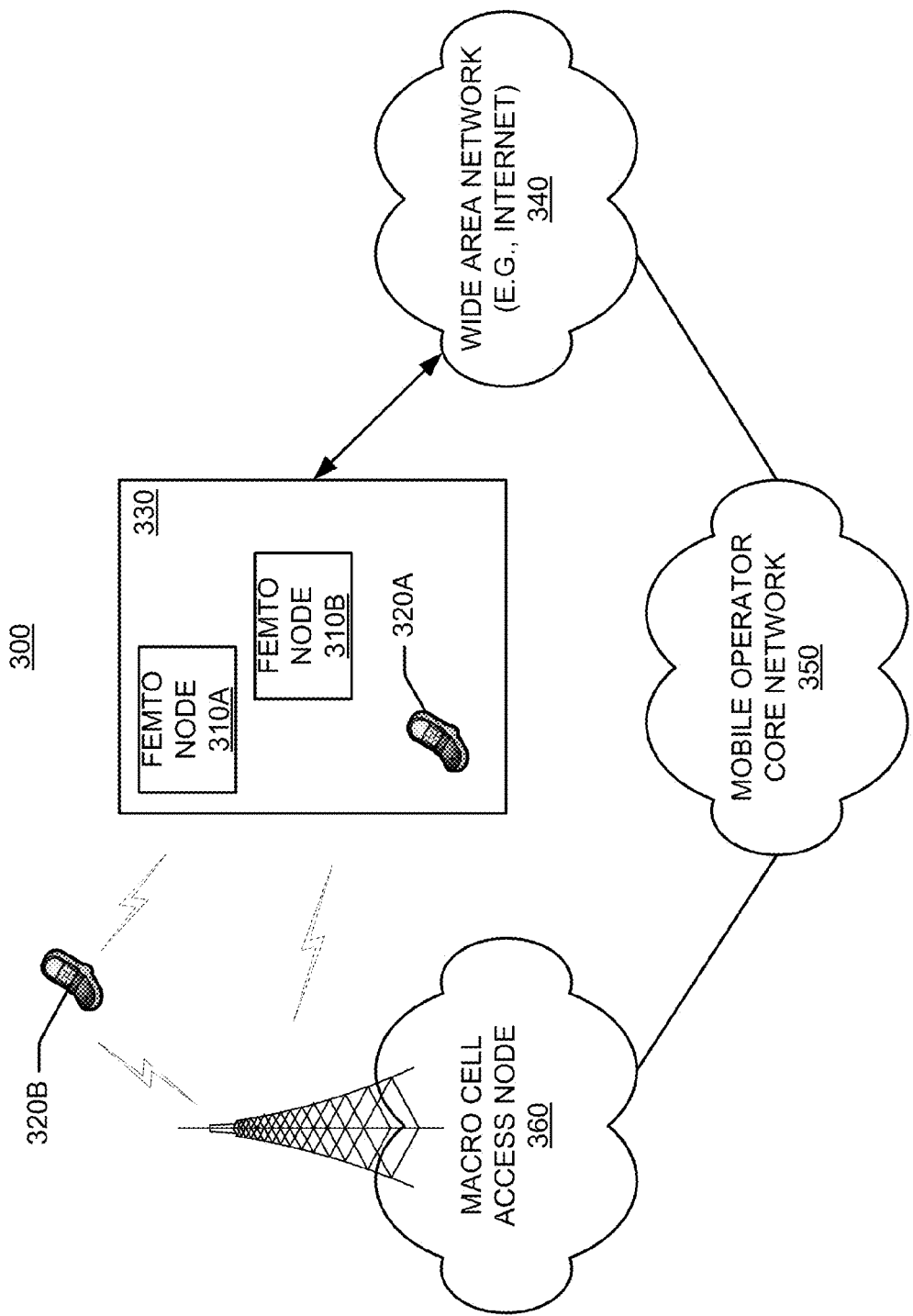
FIG. 3 is an illustration of an example wireless communication system where one or more Femto nodes are deployed for facilitating demodulation according to embodiments described herein.

FIG. 3 is an illustration of an example wireless communication system where one or more Femto nodes are deployed for facilitating simultaneous or concurrent traffic-idle or idle-idle demodulation in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
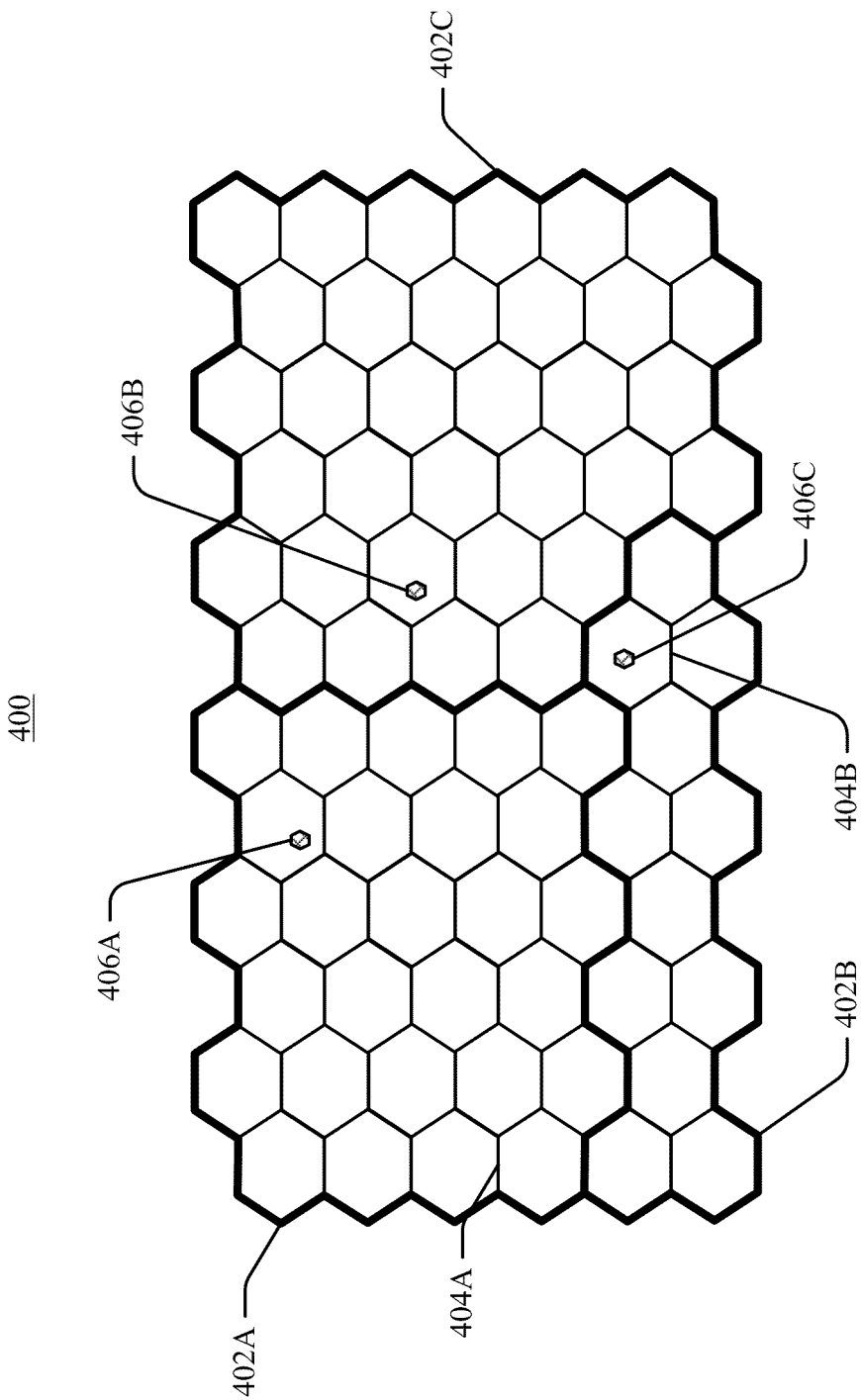
FIG. 4 is an illustration of an example coverage map in a wireless communication system for facilitating demodulation according to embodiments described herein.

FIG. 4 is an illustration of an example coverage map in a wireless communication system for facilitating simultaneous or concurrent traffic-idle or idle-idle demodulation in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to evaluate whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

Figure 5:
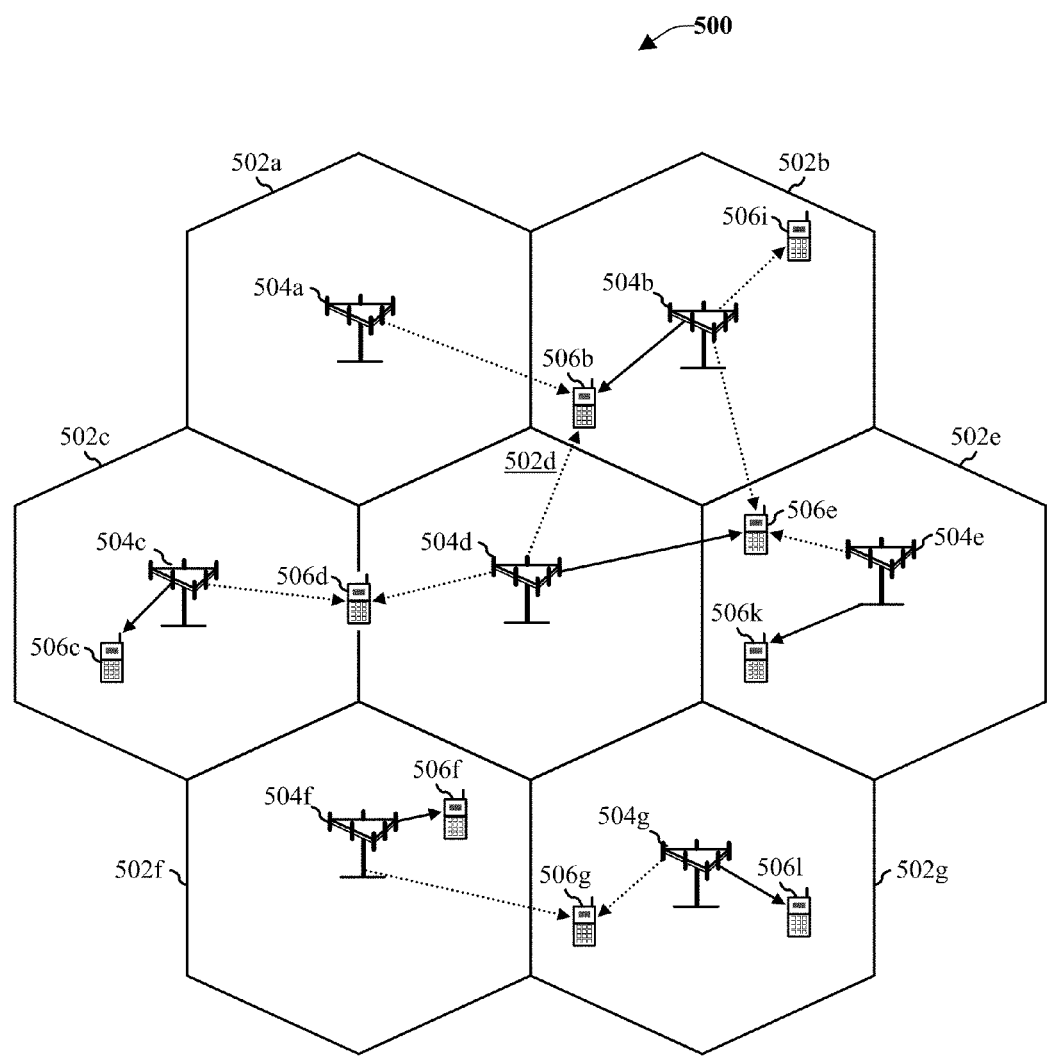
FIG. 5 is an illustration of a block diagram of a communication system according to an embodiment described herein.

FIG. 5 is a block diagram of a communication system according to an embodiment described herein. The system 500 provides communication for multiple cells 502, such as, for example, macro cells 502A-502G, with each cell being serviced by a corresponding BS 504 (e.g., BS 504A-504G). As shown in FIG. 5, UE 506 (e.g., UEs 506A-506L) can be dispersed at various locations throughout the system over time. Each UE 506 can communicate with one or more BS 504 on a DL or a UL at a given moment, depending upon whether the UE 506 is active and whether it is in soft handoff, for example. The wireless communication system 500 may provide service over a large geographic region. For example, macro cells 502A-502G may cover a few blocks in a neighborhood.

The systems, apparatus and methods described herein can be employed to facilitate simultaneous or concurrent traffic-idle or idle-idle demodulation for active mode hand-in, or idle mode hand-in, without interruption of traffic/active operations, or idle mode operations, respectively, on the macro network.

In various embodiments, a UE can have a single baseband chip architecture in which one radio access technology (RAT) and the protocol stack is either simultaneously or concurrently in a traffic state and idle state, or both are simultaneously or concurrently in an idle state. Relative to current paradigms wherein the RAT is in one state only at a particular time, numerous solutions can be provided by the embodiments described herein. For example, in one or more embodiments, uninterrupted traffic and idle operations can be provided thereby providing solutions including, but not limited to, uninterrupted traffic/active operations on a macro network during active mode Femto cell hand-ins, UE receipt of emergency alerts during a traffic/active state without interruptions, and/or uninterrupted idle operations on a macro network during idle mode Femto cell hand-ins.

Figure 6:
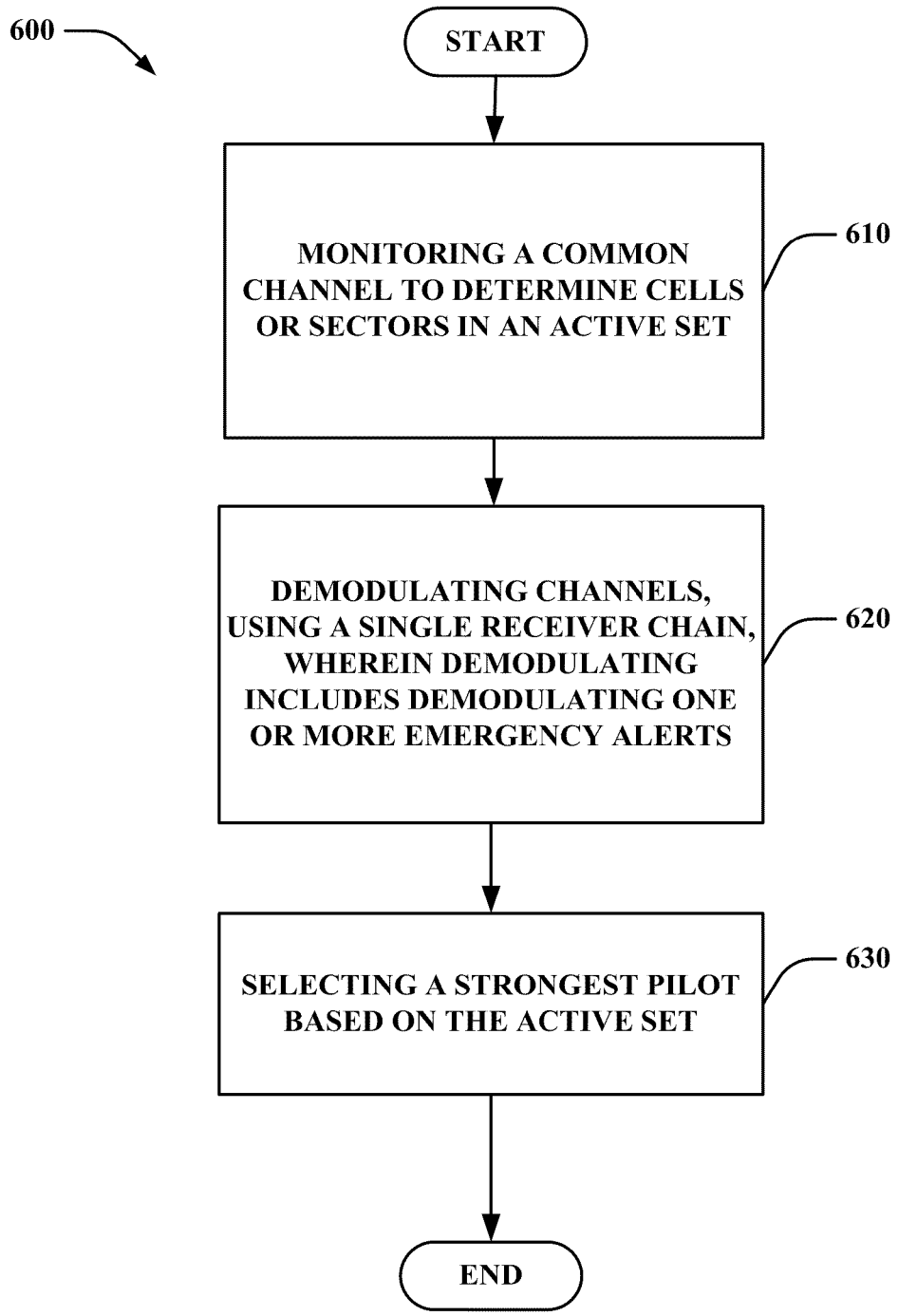
FIGS. 6, 7 and 8 illustrate flowcharts of embodiments of methods for facilitating demodulation according to embodiments described herein.
Figure 7:
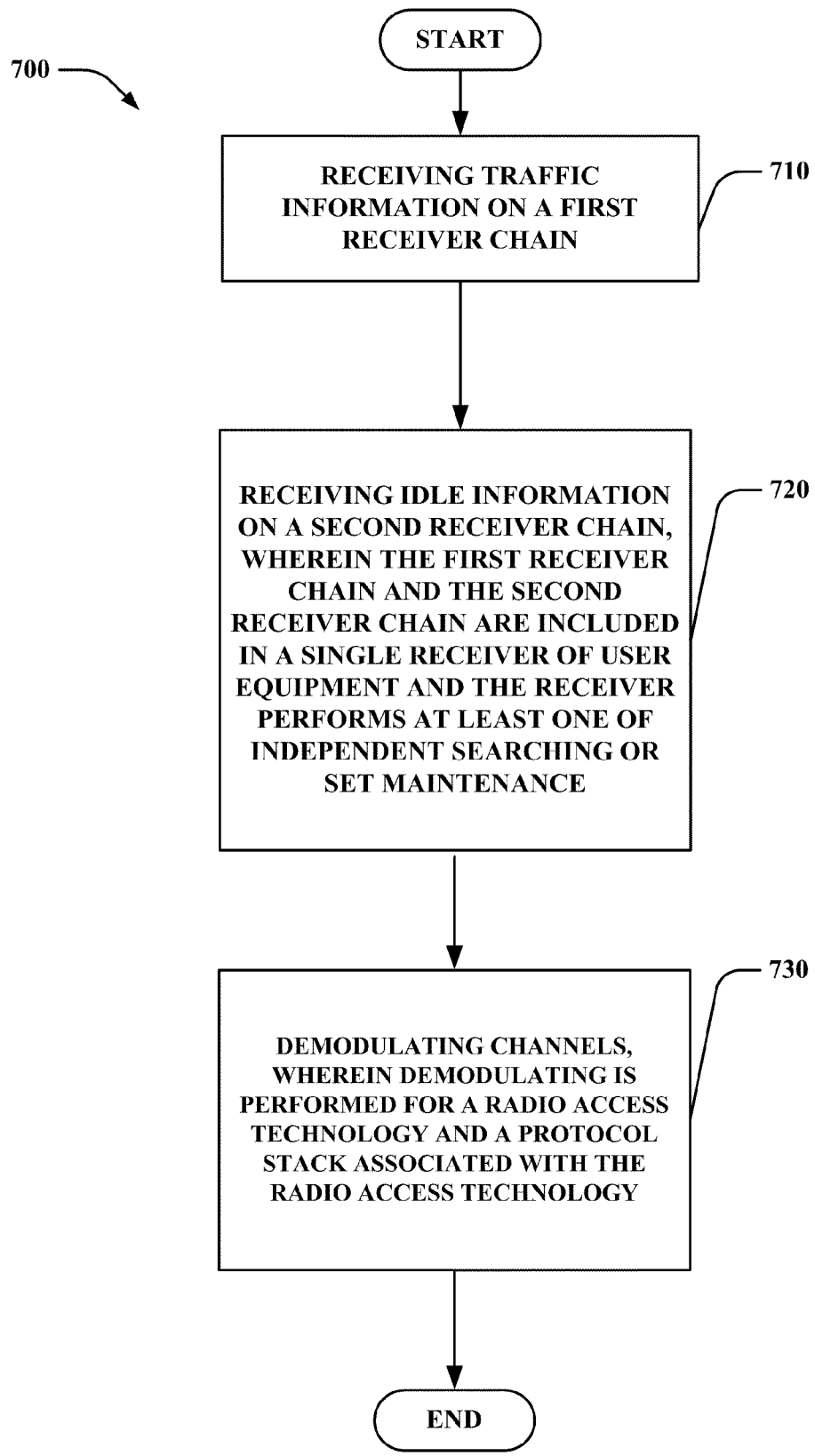
Figure 8:
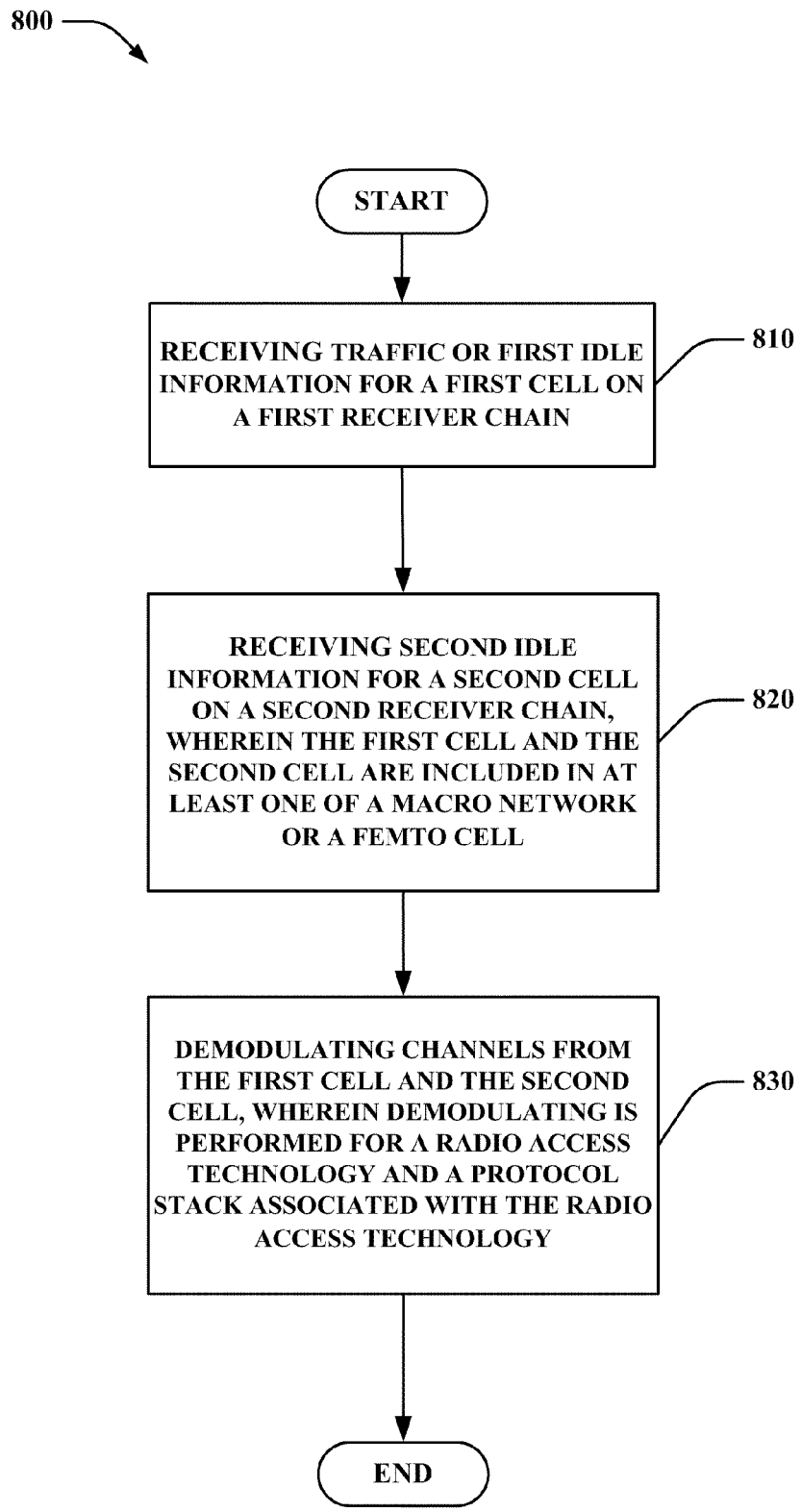

FIGS. 6, 7 and 8 are flowcharts of embodiments of methods for facilitating demodulation according to embodiments described herein.

Referring to FIG. 6, method 600 can be employed to facilitate the monitoring and receiving of emergency alerts similar to that required for the developing Federal Communications Commission (FCC) commercial mobile alert system (CMAS).

To perform the method 600, the UE receiver need include only a single receiver chain for traffic/active and idle operations, and power consumption impact may be relatively low. The traffic/active operations and idle operations can be performed employing a master-slave relationship. In some embodiments, method 600 can be performed during hand-in.

At 610, method 600 can include the UE monitoring a common channel to evaluate cells or sectors in an active set. In some embodiments, monitoring is performed by a user equipment having a single receiver chain configured to receive traffic and idle information. The monitored can be performed periodically.

In some embodiments, evaluating cells or sectors in an active set comprises evaluating cells or sectors in an active set to determine which cells or sectors have alert monitoring enabled. In some embodiments, evaluating cells or sectors in an active set comprises evaluating cells or sectors in an active set to determine optimal cell(s) or sector(s) to use for monitoring and receiving one or more commercial mobile alert system alerts at designated broadcast slots. In some embodiments, more than one cell or sector can be an optimal cell or sector for the monitoring and receiving commercial mobile alert system alerts at designated broadcast slots.

Method 600 can also include, at 620, demodulating channels, using the single receiver chain, including demodulating one or more emergency alerts. Demodulating can be performed for a RAT and a protocol stack associated with the RAT. The UE receiver fingers can demodulate both traffic and common channels, including emergency alerts at broadcast slots.

In some embodiments, method 600 also includes at 630, selecting a strongest pilot based on the active set. In some embodiments, the selection can also be based on a candidate set.

In some embodiments, the traffic and idle information are received on a same frequency. In some embodiments, channels comprise a traffic channel and a common channel. In some embodiments, the one or more emergency alerts are transmitted in broadcast slots.

Referring now to FIG. 7, similar to method 600, method 700 can be implemented in embodiments wherein the traffic and idle operations are on the same frequency. The embodiment can be employed to facilitate the monitoring and receiving of emergency alerts similar to that required for the developing Federal Communications Commission (FCC) commercial mobile alert system (CMAS).

To perform the method 700, the UE receiver can have independent receiver chains for the traffic/active operations and the idle operations. As such, the method 700 can utilize two receiver chains, similar to that for mobile receive diversity (MRD)-capable UEs or Simultaneous Hybrid Dual Receiver (SHDR)-capable UEs. The RX chains can perform independent searching, set maintenance, finger and/or receiver protocol operations. As such, the power consumption of method 700 can be greater at the UE than that for method 600.

At 710, method 700 can include receiving traffic information on a first receiver chain. In some embodiments, this process can be performed concurrent to processing information on a first transmitter chain. At 720, method 700 can include receiving idle information on a second receiver chain. The first receiver chain and the second receiver chain can be included in a single receiver of a user equipment and perform at least one of independent searching or set maintenance.

At 730, method 700 can include demodulating channels, wherein demodulating is performed for a radio access technology and a protocol stack associated with the radio access technology.

In some embodiments, the system access that results from the idle state on the first receiver chain can be suppressed. In various embodiments, the idle state can operate with different events or occurrences. By way of examples, but not limitation, the idle state can operate when MRD functionality is disabled with respect to traffic on the first receiver chain and/or as a tune-away on a first receiver chain from the MRD with respect to traffic on the first receiver chain. When the idle state operates when MRD is disabled, the operation can be in a dynamic or a static fashion. In some embodiments, the idle state on the second receiver chain is not viable in weak coverage areas in the presence of large antenna imbalance.

Referring now to FIG. 8, method 800 can be implemented in embodiments wherein the traffic and idle operations are on different frequencies. For example, method 800 can be employed for embodiments wherein the UE is the subject of a Femto cell hand-in and the macro network and the Femto cell are on different frequencies.

In various embodiments, the UE can be an SHDR-capable UE. This embodiment can utilize two receiver chains, with independent searching, set maintenance and/or finger and protocol operations for the two receiver chains, as described with reference to method 800. The receiver chains can be independently tunable.

In this embodiment, at 810, method 800 can include the UE receiving the traffic or first idle information for a first cell on a first receiver chain. In some embodiments, this process can be performed concurrent to processing information on a first transmitter chain.

At 820, method 800 can include the UE receiving second idle information for a second cell on a second receiver chain, wherein the first cell and the second cell are included in at least one of a macro network or a Femto cell. The second cell can be different from the first cell. In some embodiments, the first cell is a Femto cell and the second cell is included in a macro network. However, in various embodiments, the systems and methods described herein can be employed with any two different types of cells or with hand-in from one cell to another when the cells are of the same type, such as one Femto cell to another Femto cell. In some embodiments, the idle state and/or other information on the Femto cell are received on the first receiver chain.

At 830, method 800 can include the UE demodulating channels from the first cell and the second cell, wherein demodulating is performed for a radio access technology and a protocol stack associated with the radio access technology.

In various embodiments, system access can be invoked and/or arbitration of the transmitter can be utilized while the reception is provided. In some embodiments, the first receiver chain and the second receiver chain are included in a receiver of a user equipment for which the hand-in is performed. In some embodiments, the hand-in is from the macro network to the Femto cell.

In some embodiments, the first receiver chain and the second receiver chain are included in a receiver of a user equipment for which the hand-in is performed. In some embodiments, the channels comprise at least one of: a traffic channel from the first cell and a common channel from the second cell; or a common channel from the first cell and a common channel from the second cell. In some embodiments, the hand-in is from the macro network to the Femto cell. In some embodiments the hand-out is from the Femto cell to the macro network.

One or more of the methods 600, 700, 800 can be employed to enable a UE to receive emergency alerts while the UE is in the traffic/active state. By way of example, but not limitation, the methods 600, 700, 800 can provide functionality compatible with or similar to that for CMAS in the United States for providing emergency alerts to UEs wherein the CMAS transport mechanism broadcasts SMS on common channels during the idle state. For example, in cdma 1x systems, the SMS is broadcast for CDMA carriers and, in GSM/UMTS systems, there is a cell broadcast for 3GPP carriers.

In current UEs, the traffic/active state cannot monitor and receive emergency alerts because CMAS prohibits interrupting calls to monitor and receive emergency alerts. As such, embodiments described herein can enable one or more of the following: simultaneous traffic-idle demodulation enabling UE receipt of emergency alerts during traffic/active state without interruptions to the ongoing call at the UE (and this design requires no change on the network/BS side of the system), uninterrupted traffic/active operations on the macro network during active mode Femto cell hand-ins and/or uninterrupted idle operations on the macro network during idle mode Femto cell hand-ins.

Figure 9:
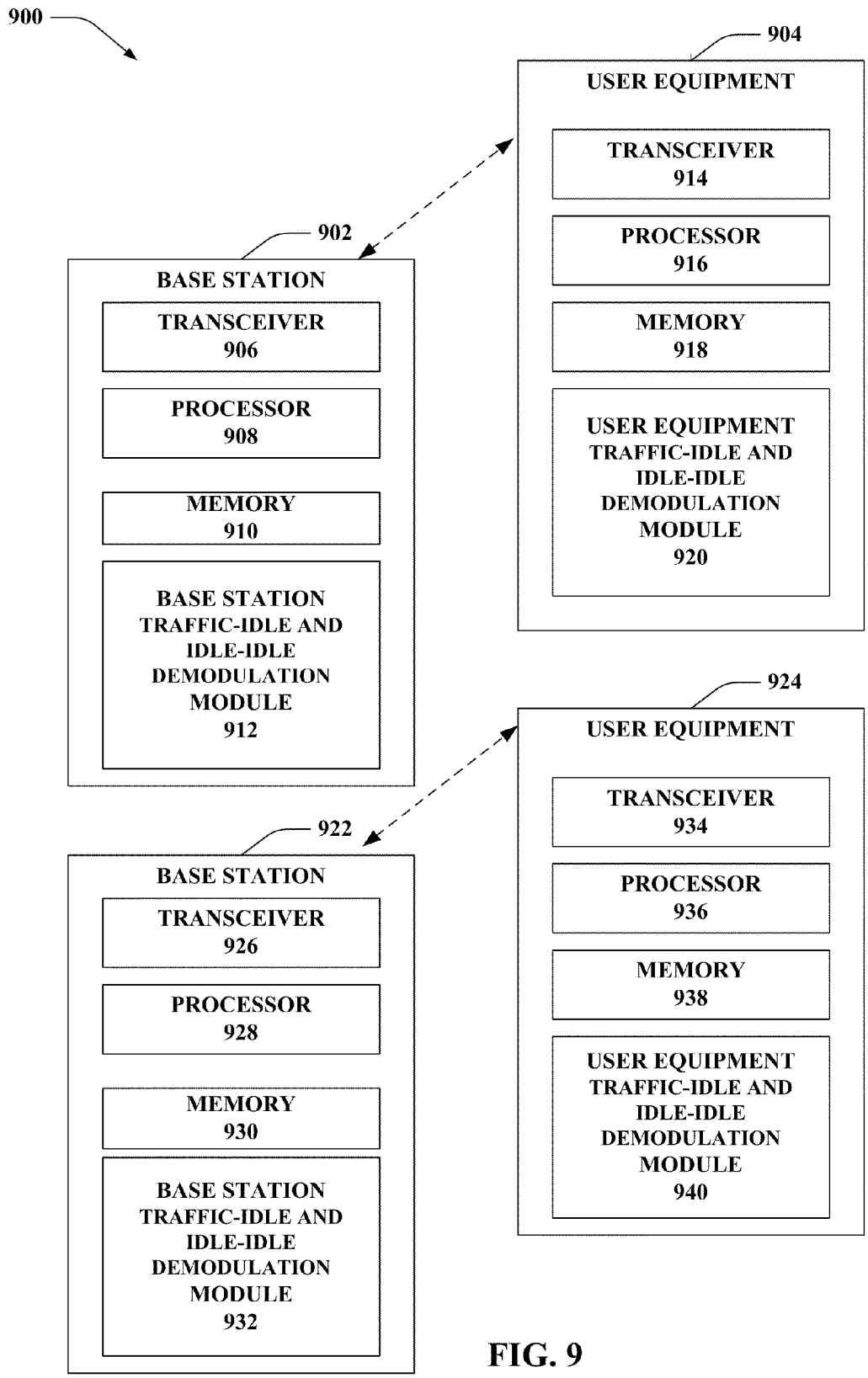
FIG. 9 is an illustration of an example block diagram of a wireless communication system for facilitating demodulation in accordance with various aspects set forth herein.

FIG. 9 is an illustration of an example block diagram of a wireless communication system for facilitating simultaneous or concurrent traffic-idle or idle-idle demodulation in accordance with various aspects set forth herein.

Referring to FIGS. 6, 7 and 8, methods for facilitating simultaneous or concurrent traffic-idle or idle-idle demodulation can be provided, as described herein. Referring specifically to FIG. 9, in the embodiments described, the BSs 902, 922 can include transceivers 906, 916 configured to transmit and receive data and/or control information and/or any other type of information described herein with reference to any of the systems, methods, apparatus and/or computer program products to and from UEs 904, 924, respectively. Transceivers 906, 916 can be configured to transmit data and/or control channel information. For example, the transceivers 906, 916 can be configured to transmit traffic and/or idle information to UEs 904, 924.

BSs 902, 922 can also include processors 908, 928 and memory 910, 930. Processors 908, 928 can be configured to perform one or more of the functions described herein with reference to any of the systems, methods, apparatus and/or computer program products. The BSs 902, 922 can include memory 910, 930, respectively. The memory 910, 930 can be for storing computer-executable instructions and/or information for performing the functions described herein with reference to any of the systems, methods, apparatus and/or computer program products.

BSs 902, 922 can also include traffic-idle and idle-idle demodulation modules 912, 932 configured to perform simultaneous or concurrent traffic-idle or idle-idle demodulation as described herein. In some embodiments, the BSs 902, 922 are configured to perform one or more of the steps for enabling methods of FIGS. 6, 7 and 8.

The UEs 904, 924 can include transceivers 914, 934 configured to transmit and receive data and/or control information and/or any other type of information described herein with reference to any of the systems, methods, apparatus and/or computer program products to and from BSs 902, 922, respectively. In some embodiments, the transceivers 914, 934 can be configured to receive traffic and/or idle information to UEs 904, 924.

UEs 904, 924 can also include processors 916, 936 and memory 918, 938. Processors 916, 936 can be configured to perform one or more of the functions described herein with reference to any of the systems, methods, apparatus and/or computer program products. The UEs 904, 924 can include memory 918, 938 respectively. The memory 918, 938 can be for storing computer-executable instructions and/or information for performing the functions described herein with reference to any of the systems, methods, apparatus and/or computer program products.

UEs 904, 924 can also include traffic-idle and idle-idle demodulation modules 920, 940 configured to facilitate simultaneous or concurrent traffic-idle or idle-idle demodulation. In some embodiments, the UE traffic-idle and idle-idle demodulation modules 920, 940 are configured to perform one or more of the steps of methods 6A, 6B, 7 and 8. In various embodiments, UEs 904, 924 can be or be included within systems 1000, 1100 and/or 1200 discussed below.

Figure 10:
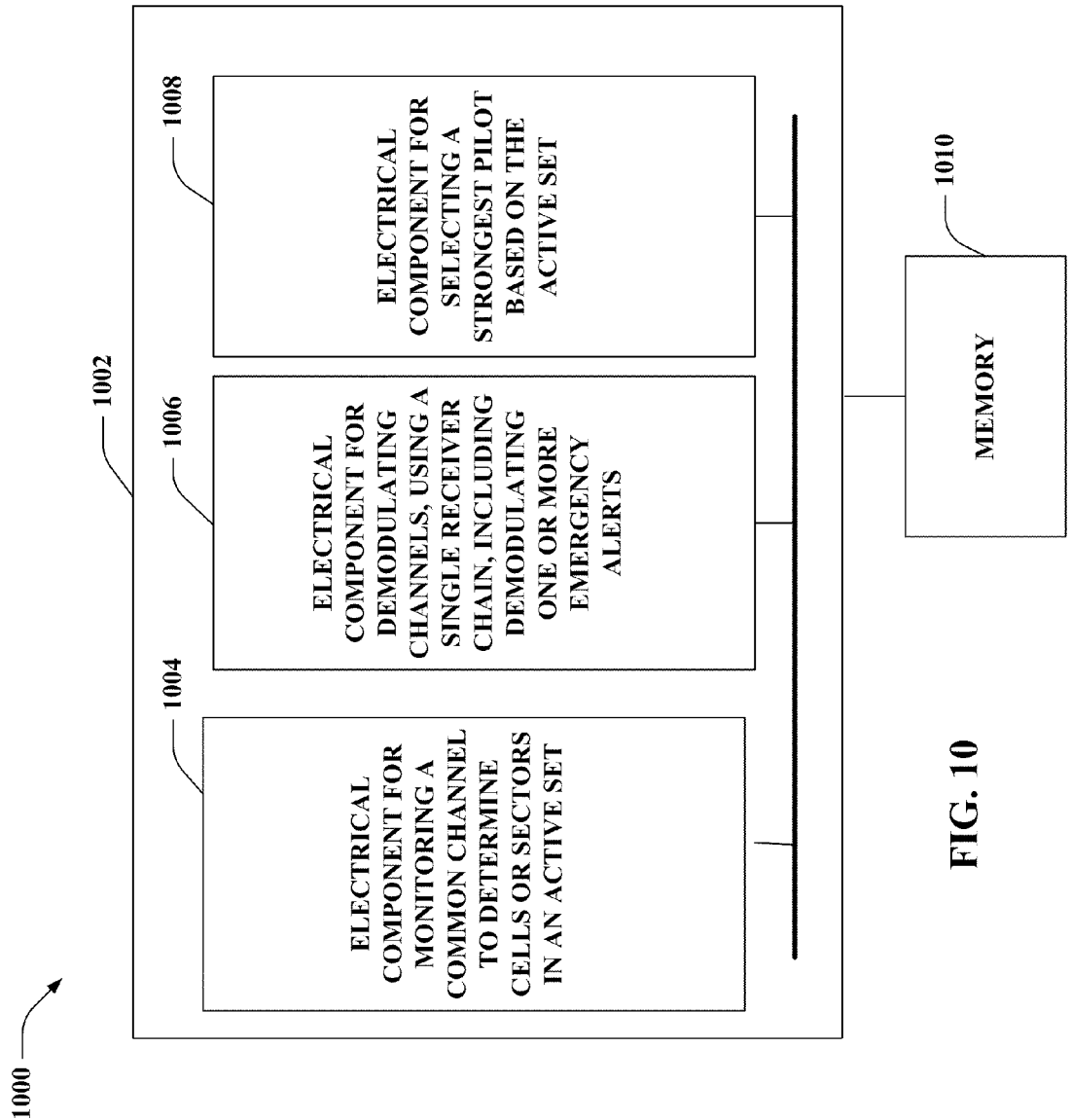
FIGS. 10, 11 and 12 are examples of illustrations of block diagrams of example systems for facilitating demodulation in accordance with various aspects set forth herein.

Referring first to FIG. 10, system 1000 can include a logical or physical grouping 1002 of electrical components. For example, logical or physical grouping 1002 can include an electrical component 1004 for monitoring a common channel to evaluate cells or sectors in an active set. In some embodiments, monitoring is performed by a user equipment having a single receiver chain configured to receive traffic and idle information. The monitored can be performed periodically.

In some embodiments, evaluating cells or sectors in an active set comprises evaluating cells or sectors in an active set to determine which cells or sectors have alert monitoring enabled. In some embodiments, evaluating cells or sectors in an active set comprises evaluating cells or sectors in an active set to determine optimal cell(s) or sector(s) to use for monitoring and receiving one or more commercial mobile alert system alerts at designated broadcast slots. In some embodiments, more than one cell or sector can be an optimal cell or sector for the monitoring and receiving commercial mobile alert system alerts at designated broadcast slots.

The logical or physical grouping 1002 can also include an electrical component 1006 for demodulating channels, using the single receiver chain, including demodulating one or more emergency alerts. Demodulating can be performed for a RAT and a protocol stack associated with the RAT. In some embodiments, receiver fingers can demodulate both traffic and common channels, including emergency alerts at broadcast slots.

The logical or physical grouping 1002 can also include an electrical component 1008 for selecting a strongest pilot based on the active set. In some embodiments, the selection can also be based on a candidate set.

In some embodiments, the traffic and idle information are received on a same frequency. In some embodiments, channels comprise a traffic channel and a common channel. In some embodiments, the one or more emergency alerts are transmitted in broadcast slots. In some embodiments, the system 1000 is a system within a UE.

The logical or physical grouping 1002 can also include an electrical component 1010 for storing.

Figure 11:
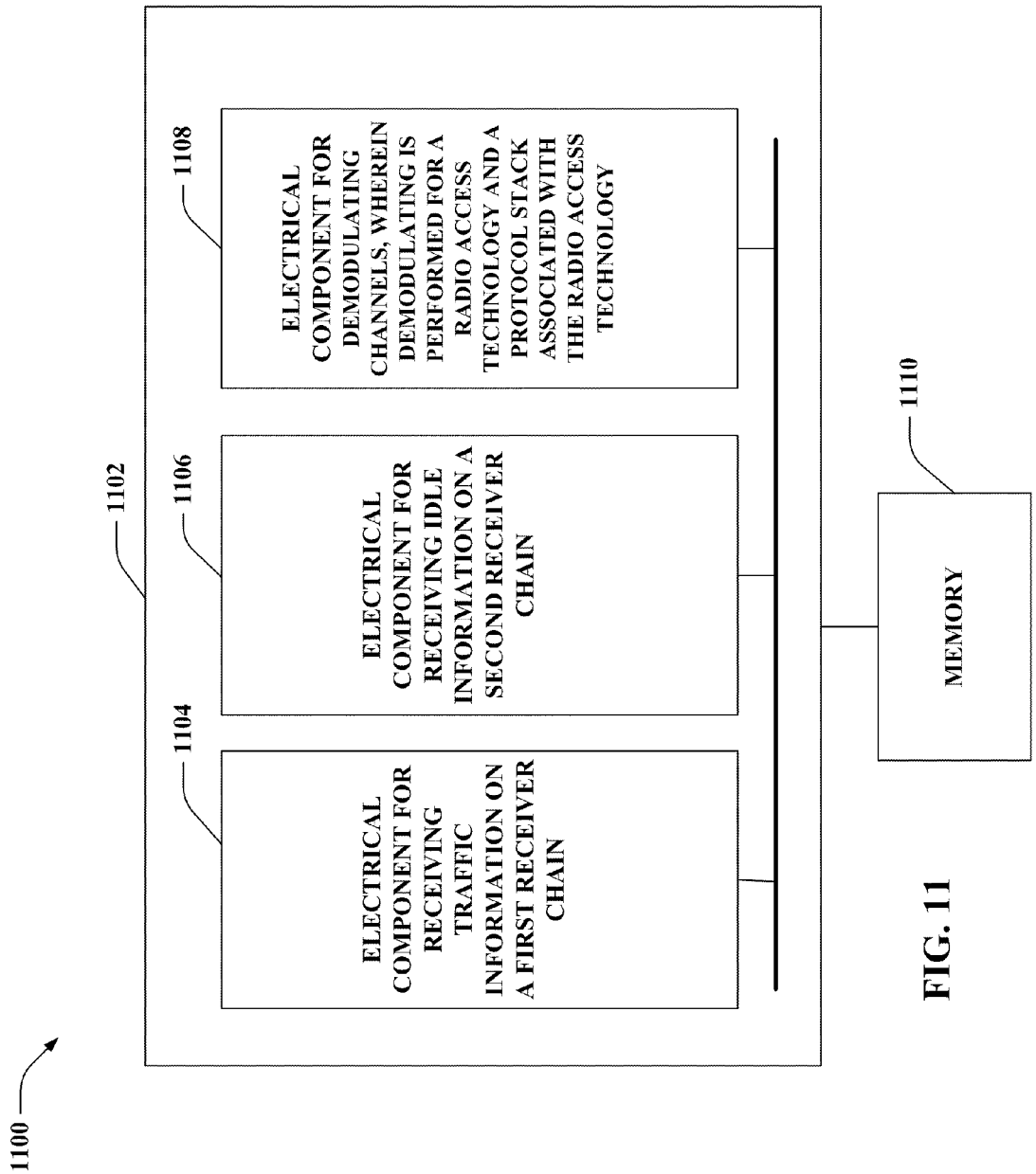

Referring now to FIG. 11, system 1100 can include a logical or physical grouping 1102 of electrical components. The system 1100 can be implemented in embodiments wherein traffic and idle operations are on the same frequency. The embodiment can be employed to facilitate the monitoring and receiving of emergency alerts similar to that required for the developing Federal Communications Commission (FCC) commercial mobile alert system (CMAS).

The system 1100 can have independent receiver chains for the traffic/active operations and the idle operations. As such, the system 1100 can utilize two receiver chains, similar to that for mobile receive diversity (MRD)-capable UEs or Simultaneous Hybrid Dual Receiver (SHDR)-capable UEs. The RX chains can perform independent searching, set maintenance, finger and/or receiver protocol operations. As such, the power consumption of system 1100 can be greater than that for system 1000 and/or system 1050.

The logical or physical grouping 1102 can include an electrical component 1104 for receiving traffic information on a first receiver chain. In some embodiments, this process can be performed concurrent to processing information on a first transmitter chain. The logical or physical grouping 1102 can include an electrical component 1106 for receiving idle information on a second receiver chain. The first receiver chain and the second receiver chain can be included in a single receiver of a user equipment and perform at least one of independent searching or set maintenance.

The logical or physical grouping 1102 can include an electrical component 1108 for demodulating channels, wherein demodulating is performed for a radio access technology and a protocol stack associated with the radio access technology.

In some embodiments, the system access that results from the idle state on the first receiver chain can be suppressed. In various embodiments, the idle state can operate with different events or occurrences. By way of examples, but not limitation, the idle state can operate when MRD functionality is disabled with respect to traffic on the first receiver chain and/or as a tune-away on a first receiver chain from the MRD with respect to traffic on the first receiver chain. When the idle state operates when MRD is disabled, the operation can be in a dynamic or a static fashion. In some embodiments, the idle state on the second receiver chain is not viable in weak coverage areas in the presence of large antenna imbalance.

The logical or physical grouping 1102 can include an electrical component 1110 for storing.

Figure 12:
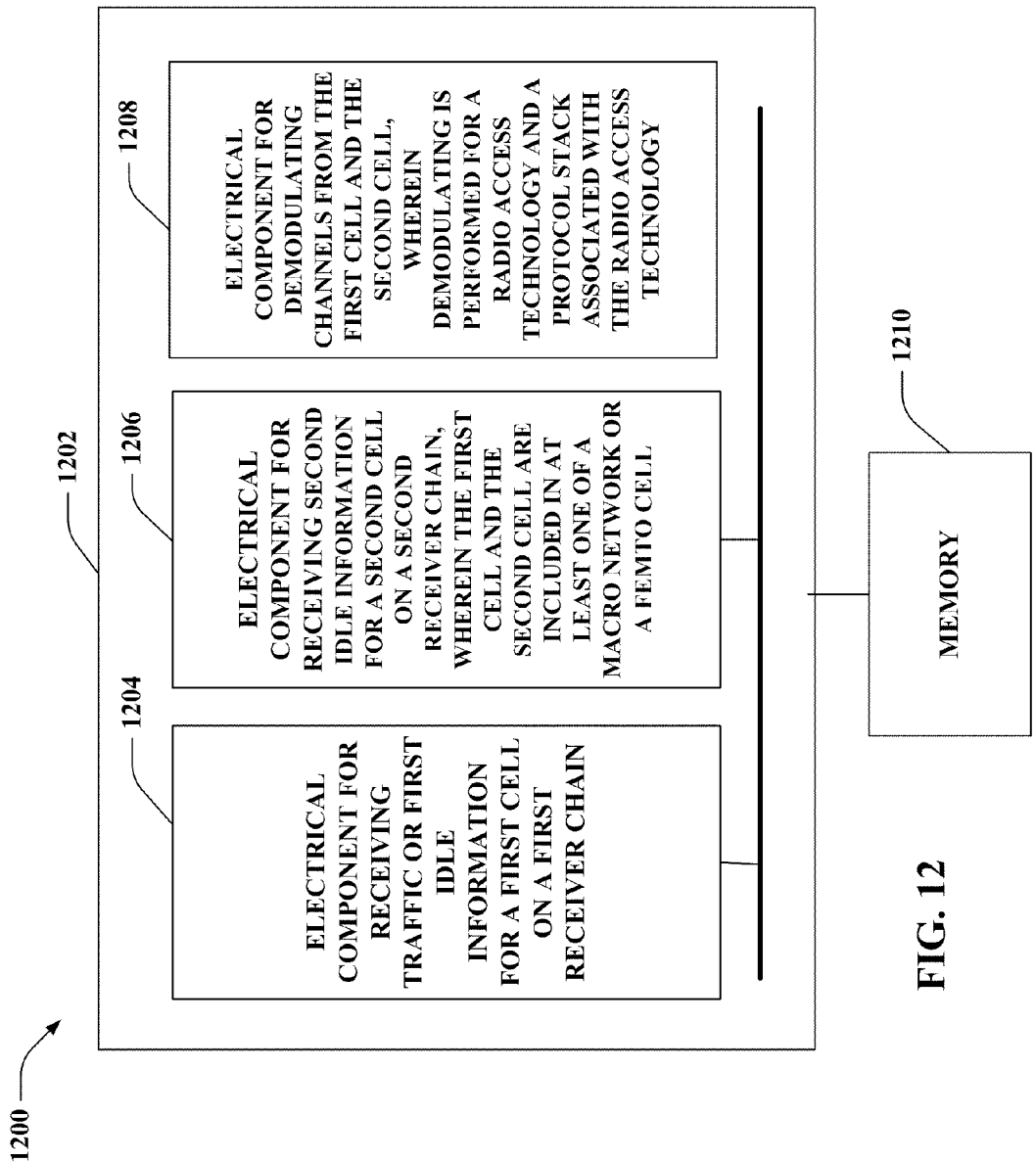

Referring now to FIG. 12, system 1200 can include a logical or physical grouping 1202 of electrical components.

The system 1200 can be implemented in embodiments wherein the traffic and idle operations are on different frequencies. For example, system 1200 can be employed for embodiments in a UE wherein the UE is the subject of a Femto cell hand-in and the macro network and the Femto cell are on different frequencies.

In various embodiments, the UE can be an SHDR-capable UE. This embodiment can utilize two receiver chains, with independent searching, set maintenance and/or finger and protocol operations for the two receiver chains, as described with reference to method 800. The receiver chains can be independently tunable.

The logical or physical grouping 1202 can include an electrical component 1204 for receiving traffic or first idle information for a first cell on a first receiver chain. In some embodiments, this process can be performed concurrent to processing information on a first transmitter chain.

The logical or physical grouping 1202 can include an electrical component 1206 for receiving second idle information for a second cell on a second receiver chain, wherein the first cell and the second cell are included in at least one of a macro network or a Femto cell. The second cell can be different from the first cell.

The logical or physical grouping 1202 can include an electrical component 1208 for demodulating channels from the first cell and the second cell, wherein demodulating is performed for a radio access technology and a protocol stack associated with the radio access technology.

In some embodiments, the first cell is a Femto cell and the second cell is included in a macro network. However, in various embodiments, the systems and methods described herein can be employed with any two different types of cells or with hand-in from one cell to another when the cells are of the same type, such as one Femto cell to another Femto cell. In some embodiments, the idle state and/or other information on the Femto cell are received on the first receiver chain.

The logical or physical grouping 1202 can include an electrical component 1210 for storing code and/or instructions for performing one or more functions described herein.

In various embodiments, system access can be invoked and/or arbitration of the transmitter can be utilized while the reception is provided. In some embodiments, the first receiver chain and the second receiver chain are included in a receiver of a user equipment for which the hand-in is performed. In some embodiments, the hand-in is from the macro network to the Femto cell.

One or more of the systems 1000, 1100, 1200 can be employed to enable a UE to receive emergency alerts while the UE is in the traffic/active state. By way of example, but not limitation, the systems 1000, 1100, 1200 can provide functionality compatible with or similar to that for CMAS in the United States for providing emergency alerts to UEs wherein the CMAS transport mechanism broadcasts SMS on common channels during the idle state. For example, in cdma 1x systems, the SMS is broadcast for CDMA carriers and, in GSM/UMTS systems, there is a cell broadcast for 3GPP carriers.

In current systems (e.g., current UEs), the traffic/active state cannot monitor and receive emergency alerts because CMAS prohibits interrupting calls to monitor and receive emergency alerts. As such, embodiments described herein can enable one or more of the following: simultaneous traffic-idle demodulation enabling UE receipt of emergency alerts during traffic/active state without interruptions to the ongoing call at the UE (and this design requires no change on the network/BS side of the system), uninterrupted traffic/active operations on the macro network during active mode Femto cell hand-ins and/or uninterrupted idle operations on the macro network during idle mode Femto cell hand-ins.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to facilitate simultaneous operations, the method comprising:
    monitoring a common channel to evaluate cells or sectors in an active set, wherein monitoring is performed by a user equipment having a single receiver chain configured to receive traffic and idle information; and
    demodulating channels, using the single receiver chain, including demodulating one or more emergency alerts, wherein demodulating is performed for a radio access technology and a protocol stack associated with the radio access technology that are simultaneously in a traffic state and an idle state.

2. The method of claim 1, further comprising selecting a strongest pilot based on the active set.

3. The method of claim 1, wherein traffic information and idle information are received on a same frequency.

4. The method of claim 1, wherein the channels comprise a traffic channel and a common channel.

5. The method of claim 1, wherein one or more emergency alerts are transmitted in broadcast slots.

6. The method of claim 1, wherein evaluating cells or sectors in an active set comprises evaluating cells or sectors in an active set to determine which cells or sectors have alert monitoring enabled.

7. The method of claim 1, wherein evaluating cells or sectors in an active set comprises evaluating cells or sectors in an active set to determine one or more optimal cells or sectors to use for monitoring and receiving one or more commercial mobile alert system alerts at designated broadcast slots.

8. A computer program product, comprising:
    a non-transitory computer-readable medium, comprising:
        a first set of codes for causing a computer to monitor a common channel to evaluate cells or sectors in an active set, wherein monitoring is performed by a user equipment having a single receiver chain configured to receive traffic and idle information; and
        a second set of codes for causing the computer to demodulate channels, using the single receiver chain, including demodulating one or more emergency alerts, wherein demodulating is performed for a radio access technology and a protocol stack associated with the radio access technology that are simultaneously in a traffic state and an idle state.

9. The computer program product of claim 8, further comprising a third set of codes for causing the computer to select a strongest pilot based on the active set.

10. The computer program product of claim 8, wherein traffic information and idle information are received on a same frequency.

11. The computer program product of claim 8, wherein the channels comprise a traffic channel and a common channel.

12. The computer program product of claim 8, wherein one or more emergency alerts are transmitted in broadcast slots.

13. The computer program product of claim 8, wherein evaluating cells or sectors in an active set comprises evaluating cells or sectors in an active set to determine which cells or sectors have alert monitoring enabled.

14. The computer program product of claim 8, wherein evaluating cells or sectors in an active set comprises evaluating cells or sectors in an active set to determine one or more optimal cells or sectors to use for monitoring and receiving one or more commercial mobile alert system alerts at designated broadcast slots.

15. An apparatus, comprising:
    means for monitoring a common channel to evaluate cells or sectors in an active set, wherein monitoring is performed by a user equipment having a single receiver chain configured to receive traffic and idle information; and
    means for demodulating channels, using the single receiver chain, including demodulating one or more emergency alerts, wherein demodulating is performed for a radio access technology and a protocol stack associated with the radio access technology that are simultaneously in a traffic state and an idle state.

16. The apparatus of claim 15, further comprising means for selecting a strongest pilot based on the active set.

17. The apparatus of claim 15, wherein traffic information and idle information are received on a same frequency.

18. The apparatus of claim 15, wherein channels comprise a traffic channel and a common channel.

19. The apparatus of claim 15, wherein one or more emergency alerts are transmitted in broadcast slots.

20. The apparatus of claim 15, wherein evaluating cells or sectors in an active set comprises evaluating cells or sectors in an active set to determine which cells or sectors have alert monitoring enabled.

21. The apparatus of claim 15, wherein evaluating cells or sectors in an active set comprises evaluating cells or sectors in an active set to determine one or more optimal cells or sectors to use for monitoring and receiving one or more commercial mobile alert system alerts at designated broadcast slots.

22. An apparatus, comprising:
    a receiver system configured to:
        monitor a common channel to evaluate cells or sectors in an active set, wherein monitoring is performed by a user equipment having a single receiver chain configured to receive traffic and idle information; and
demodulate channels, using the single receiver chain, including demodulating one or more emergency alerts, wherein demodulating is performed for a radio access technology and a protocol stack associated with the radio access technology that are simultaneously in a traffic state and an idle state.

23. The apparatus of claim 22, wherein the receiver system is further configured to select a strongest pilot based on the active set.

24. The apparatus of claim 22, wherein the receiver system is further configured to receive traffic information and idle information on a same frequency.

25. The apparatus of claim 22, wherein the channels comprise a traffic channel and a common channel.

26. The apparatus of claim 22, wherein one or more emergency alerts are transmitted in broadcast slots.

27. The apparatus of claim 22, wherein evaluating cells or sectors in an active set comprises evaluating cells or sectors in an active set to determine which cells or sectors have alert monitoring enabled.

28. The apparatus of claim 22, wherein evaluating cells or sectors in an active set comprises evaluating cells or sectors in an active set to determine one or more optimal cells or sectors to use for monitoring and receiving one or more commercial mobile alert system alerts at designated broadcast slots.

29. A method to facilitate simultaneous operations, the method comprising:
receiving traffic information on a first receiver chain;
receiving idle information on a second receiver chain, wherein the first receiver chain and the second receiver chain are included in a single receiver of a user equipment and perform at least one of independent searching or set maintenance; and
demodulating channels, wherein demodulating is performed for a radio access technology and a protocol stack associated with the radio access technology that are simultaneously in a traffic state and an idle state.

30. The method of claim 29, wherein traffic information and idle information are received on a same frequency.

31. The method of claim 29, wherein the channels comprise a traffic channel and a common channel.

32. The method of claim 29, wherein the demodulating includes demodulating one or more emergency alerts transmitted in broadcast slots.

33. A computer program product, comprising:
a non-transitory computer-readable medium, comprising:
a first set of codes for causing a computer to receive traffic information on a first receiver chain;
a second set of codes for causing the computer to receive idle information on a second receiver chain, wherein the first receiver chain and the second receiver chain are included in a single receiver of a user equipment and perform at least one of independent searching or set maintenance; and
a third set of codes for causing the computer to demodulate channels, wherein demodulating is performed for a radio access technology and a protocol stack associated with the radio access technology that are simultaneously in a traffic state and an idle state.

34. The computer program product of claim 33, wherein traffic information and idle information are received on a same frequency.

35. The computer program product of claim 33, wherein the channels comprise a traffic channel and a common channel.

36. The computer program product of claim 33, wherein the demodulating includes demodulating one or more emergency alerts transmitted in broadcast slots.

37. An apparatus, comprising:
means for receiving traffic information on a first receiver chain;
means for receiving idle information on a second receiver chain, wherein the first receiver chain and the second receiver chain are included in a single receiver of a user equipment and perform at least one of independent searching or set maintenance; and
means for demodulating channels, wherein demodulating is performed for a radio access technology and a protocol stack associated with the radio access technology that are simultaneously in a traffic state and an idle state.

38. The apparatus of claim 37, wherein traffic information and idle information are received on a same frequency.

39. The apparatus of claim 37, wherein channels comprise a traffic channel and a common channel.

40. The apparatus of claim 37, wherein the demodulating includes demodulating one or more emergency alerts transmitted in broadcast slots.

41. An apparatus, comprising:
a receiver system configured to:
receive traffic information on a first receiver chain;
receive idle information on a second receiver chain, wherein the first receiver chain and the second receiver chain are included in a single receiver of a user equipment and perform at least one of independent searching or set maintenance; and
demodulate channels, wherein demodulating is performed for a radio access technology and a protocol stack associated with the radio access technology that are simultaneously in a traffic state and an idle state.

42. The apparatus of claim 41, wherein traffic information and idle information are received on a same frequency.

43. The apparatus of claim 41, wherein the channels comprise a traffic channel and a common channel.

44. The apparatus of claim 41, wherein the demodulating includes demodulating one or more emergency alerts transmitted in broadcast slots.

45. A method to facilitate simultaneous active and idle operations or simultaneous idle and idle operations during hand-in or hand-out, the method comprising:
receiving traffic or first idle information for a first cell on a first receiver chain;
receiving second idle information for a second cell on a second receiver chain, wherein the first cell and the second cell are included in at least one of a macro network or a Femto cell; and
demodulating channels from the first cell and the second cell, wherein demodulating is performed for a radio access technology and a protocol stack associated with the radio access technology that are simultaneously in a first state and a second state, the first state being a traffic or first idle state corresponding to the first cell, the second state being a second idle state corresponding to the second cell.

46. The method of claim 45, wherein the first receiver chain and the second receiver chain are included in a receiver of a user equipment for which the hand-in is performed.

47. The method of claim 45, wherein the channels comprise at least one of: a traffic channel from the first cell and a common channel from the second cell; or a common channel from the first cell and a common channel from the second cell.

48. The method of claim 45, wherein at least one of the hand-in is from the macro network to the Femto cell or the hand-out is from the Femto cell to the macro network.

49. A computer program product, comprising:
a non-transitory computer-readable medium, comprising:
a first set of codes for causing a computer to receive traffic or first idle information for a first cell on a first receiver chain;
a second set of codes for causing the computer to receive second idle information for a second cell on a second receiver chain, wherein the first cell and the second cell are included in at least one of a macro network or a Femto cell; and
a third set of codes for causing the computer to demodulate channels from the first cell and the second cell, wherein demodulating is performed for a radio access technology and a protocol stack associated with the radio access technology that are simultaneously in a first state and a second state, the first state being a traffic or first idle state corresponding to the first cell, the second state being a second idle state corresponding to the second cell.

50. The computer program product of claim 49, wherein the first receiver chain and the second receiver chain are included in a receiver of a user equipment for which hand-in is performed, wherein simultaneous active and idle operations or simultaneous idle and idle operations are performed during the hand-in or during hand-out.

51. The computer program product of claim 49, wherein the channels comprise at least one of: a traffic channel from the first cell and a common channel from the second cell; or a common channel from the first cell and a common channel from the second cell.

52. The computer program product of claim 49, wherein at least one of hand-in is from the macro network to the Femto cell or hand-out is from the Femto cell to the macro network, wherein simultaneous active and idle operations or simultaneous idle and idle operations are performed during hand-in or during hand-out.

53. An apparatus, comprising:
means for receiving traffic or first idle information for a first cell on a first receiver chain;
means for receiving second idle information for a second cell on a second receiver chain, wherein the first cell and the second cell are included in at least one of a macro network or a Femto cell; and
means for demodulating channels from the first cell and the second cell, wherein demodulating is performed for a radio access technology and a protocol stack associated with the radio access technology that are simultaneously in a first state and a second state, the first state being a traffic or first idle state corresponding to the first cell, the second state being a second idle state corresponding to the second cell.

54. The apparatus of claim 53, wherein the first receiver chain and the second receiver chain are included in a receiver of a user equipment for which hand-in is performed, wherein simultaneous active and idle operations or simultaneous idle and idle operations are performed during the hand-in or during hand-out.

55. The apparatus of claim 53, wherein channels comprise at least one of: a traffic channel from the first cell and a common channel from the second cell; or a common channel from the first cell and a common channel from the second cell.

56. The apparatus of claim 53, wherein at least one of the hand-in is from the macro network to the Femto cell or hand-out is from the Femto cell to the macro network, wherein simultaneous active and idle operations or simultaneous idle and idle operations are performed during hand-in or during hand-out.

57. An apparatus, comprising:
a receiver system configured to:
receive traffic or first idle information for a first cell on a first receiver chain;
receive second idle information for a second cell on a second receiver chain, wherein the first cell and the second cell are included in at least one of a macro network or a Femto cell; and
demodulate channels from the first cell and the second cell, wherein demodulating is performed for a radio access technology and a protocol stack associated with the radio access technology that are simultaneously in a first state and a second state, the first state being a traffic or first idle state corresponding to the first cell, the second state being a second idle state corresponding to the second cell.

58. The apparatus of claim 57, wherein the first receiver chain and the second receiver chain are included in a receiver of a user equipment for which hand-in is performed, wherein simultaneous active and idle operations or simultaneous idle and idle operations are performed during the hand-in or during hand-out.

59. The apparatus of claim 57, wherein the channels comprise at least one of:
a traffic channel from the first cell and a common channel from the second cell; or a common channel from the first cell and a common channel from the second cell.

60. The apparatus of claim 57, wherein at least one of the hand-in is from the macro network to the Femto cell or hand-out is from the Femto cell to the macro network, wherein simultaneous active and idle operations or simultaneous idle and idle operations are performed during hand-in or during hand-out.

* * * * *